United States Patent
Duval

(10) Patent No.: US 12,333,016 B2
(45) Date of Patent: *Jun. 17, 2025

(54) AUTHENTICATING SOFTWARE IMAGES

(71) Applicant: Micron Technology, Inc., Boise, ID (US)

(72) Inventor: Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,885

(22) Filed: Sep. 15, 2023

(65) Prior Publication Data
US 2024/0005006 A1    Jan. 4, 2024

Related U.S. Application Data

(63) Continuation of application No. 17/871,255, filed on Jul. 22, 2022, now Pat. No. 11,783,045, which is a
(Continued)

(51) Int. Cl.
*G06F 21/57* (2013.01)
*G06F 9/54* (2006.01)
(Continued)

(52) U.S. Cl.
CPC ............ *G06F 21/575* (2013.01); *G06F 9/542* (2013.01); *G06F 21/572* (2013.01); *G06F 21/602* (2013.01); *G06F 21/79* (2013.01)

(58) Field of Classification Search
CPC ...... G06F 21/575; G06F 9/542; G06F 21/572; G06F 21/602; G06F 21/79; G06F 21/57
See application file for complete search history.

(56) References Cited

U.S. PATENT DOCUMENTS

| 6,149,522 A | 11/2000 | Alcorn et al. |
| 6,836,888 B1 | 12/2004 | Basu et al. |

(Continued)

FOREIGN PATENT DOCUMENTS

| CN | 103365629 A | 10/2013 |
| CN | 109284599 A | 1/2019 |

(Continued)

OTHER PUBLICATIONS

International Search Report and Written Opinion received for PCT Patent Application No. PCT/US21/37262, mailed on Sep. 27, 2021, 8 pages.

(Continued)

*Primary Examiner* — John B King
(74) *Attorney, Agent, or Firm* — Holland & Hart LLP

(57) ABSTRACT

Methods, systems, and devices for authenticating software images are described. Software images may include different portions (e.g., different versions, different users) that may be authenticated using hashes associated with an underlying data structure of the portion of the software image. In some examples, hashes (e.g., first hashes) associated with the software image may be generated and stored using a tree structure, such that a previous hash may be used when calculating a hash associated with a new portion of the software image. To authenticate a portion of the software image, a command may be issued, and a second hash may be calculated using the current data structure of the software image. The second hash may be compared to the associated first hash, and the software image may be authenticated based on the hashes matching.

20 Claims, 8 Drawing Sheets

Related U.S. Application Data continuation of application No. 16/905,046, filed on Jun. 18, 2020, now Pat. No. 11,416,621.

(51) Int. Cl.
*G06F 21/60* (2013.01)
*G06F 21/79* (2013.01)

(56) References Cited

U.S. PATENT DOCUMENTS

| | | | |
|---|---|---|---|
| 6,961,852 B2 | 11/2005 | Craft | |
| 7,848,746 B2 | 12/2010 | Juels | |
| 8,639,840 B2* | 1/2014 | Chang | G06F 12/0806 710/33 |
| 9,087,187 B1 | 7/2015 | Doane | |
| 10,282,538 B2* | 5/2019 | Otturu | H04L 41/0813 |
| 2002/0073316 A1 | 6/2002 | Collins et al. | |
| 2003/0200454 A1 | 10/2003 | Foster et al. | |
| 2004/0255145 A1* | 12/2004 | Chow | G06F 12/1466 726/16 |
| 2004/0268135 A1 | 12/2004 | Zimmer et al. | |
| 2005/0010767 A1 | 1/2005 | Craft | |
| 2008/0021834 A1* | 1/2008 | Holla | G16H 80/00 705/51 |
| 2009/0006859 A1* | 1/2009 | Zimmer | G06F 21/575 713/186 |
| 2009/0049510 A1* | 2/2009 | Zhang | G06F 21/53 718/1 |
| 2009/0193211 A1 | 7/2009 | Hu et al. | |
| 2011/0296408 A1 | 12/2011 | Lo et al. | |
| 2012/0011299 A1* | 1/2012 | Mylly | G06F 12/0246 711/E12.001 |
| 2013/0263255 A1 | 10/2013 | Wolf | |
| 2014/0359268 A1 | 12/2014 | Jauhiainen et al. | |
| 2016/0364707 A1 | 12/2016 | Varma | |
| 2017/0116427 A1 | 4/2017 | Major et al. | |
| 2018/0246643 A1* | 8/2018 | Jenne | G06F 3/0659 |
| 2019/0087792 A1 | 3/2019 | Chow et al. | |
| 2019/0319807 A1 | 10/2019 | Fairfax et al. | |
| 2019/0358515 A1 | 11/2019 | Tran et al. | |
| 2020/0082086 A1 | 3/2020 | Nagaraju et al. | |
| 2020/0082153 A1 | 3/2020 | Holden et al. | |
| 2021/0223968 A1* | 7/2021 | Umesawa | H04L 9/3263 |
| 2021/0232384 A1* | 7/2021 | Lewis | G06F 21/572 |
| 2021/0357205 A1* | 11/2021 | Ashirvad | G06F 8/658 |

FOREIGN PATENT DOCUMENTS

| | | | |
|---|---|---|---|
| CN | 111201519 A | 5/2020 | |
| TW | 201141173 A | 11/2011 | |
| TW | 1667619 B | 8/2019 | |

OTHER PUBLICATIONS

Office Action received for Taiwan Patent Application No. 110119169, mailed on Jan. 25, 2022, 17 pages (7 pages of English Translation and 10 pages of Original Document).

Taiwanese Patent Office, "Office Action," issued in connection with Taiwanese Patent Application No. 111137708 dated Mar. 22, 2023 (12 pages). (5 pages of English Translation and 7 pages of Original Document).

* cited by examiner

AUTHENTICATING SOFTWARE IMAGES

CROSS REFERENCE

The present Application for Patent is a continuation of U.S. patent application Ser. No. 17/871,255 by Duval, entitled "AUTHENTICATING SOFTWARE IMAGES," filed Jul. 22, 2022, which is a continuation of U.S. patent application Ser. No. 16/905,046 by Duval, entitled "AUTHENTICATING SOFTWARE IMAGES," filed Jun. 18, 2020, each of which is assigned to the assignee hereof, and each of which is expressly incorporated by reference in its entirety herein.

BACKGROUND

The following relates generally to one or more memory systems and more specifically to authenticating software images.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
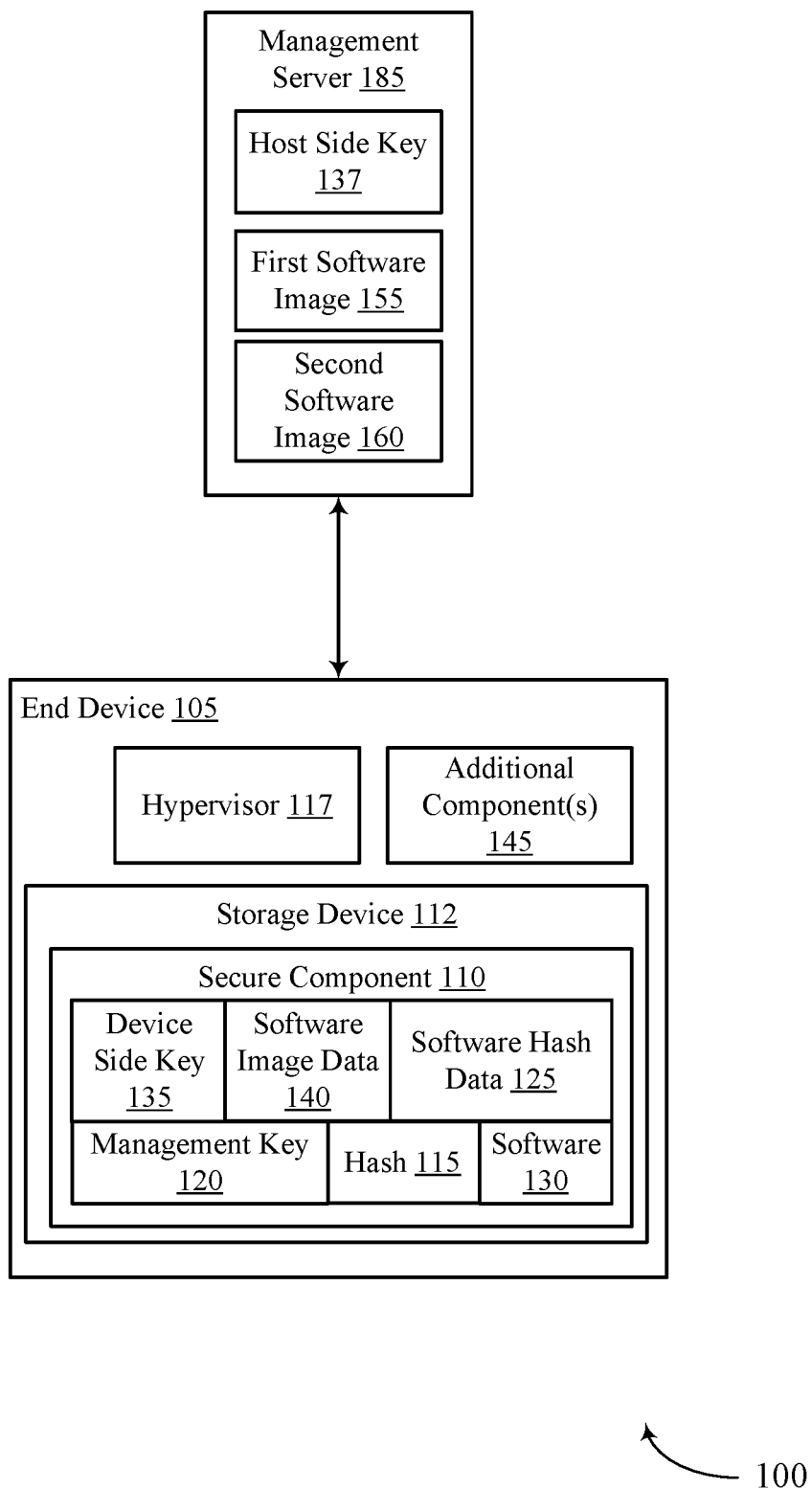
FIG. 1 illustrates an example of a system that supports authenticating software images in accordance with examples as disclosed herein.

Some computing systems may include one or more virtual machines. A virtual machine may be an emulation of a computer system that provides the functionality of a physical computer. In some examples, a virtual machine may be run by a host computing device. The virtual machine source code may be stored in a software image. Like physical computing devices, virtual machines may be accessed by guest users (e.g., individuals using guest profiles) and may be updated periodically using a software update. In some instances, malicious actors (e.g., hackers) may modify the behavior of a virtual machine by altering one or more aspects of code of the virtual machine, including modifying code intended for a software update. Accordingly, it may be beneficial to authenticate software images to prevent malicious actors from altering or gaining control of one or more aspects of a virtual machine.

Techniques are described herein for authenticating software images of virtual machines. Each virtual machine running on a host computing device may be accessed by different users, and its operating system and software programs may be running on different versions. To authenticate software images of the different virtual machines, indications of data associated with different users and versions of a software image may be stored as nodes in a tree structure saved to a secure storage device. Additionally, a hash may be generated for each node that is based on the associated indication of data and a hash of a prior node (e.g., a parent node) in the tree. Using the hashes of parent nodes to generate the hash may reduce the time used to generate the hash, and may reduce the size of the software image's data, thus reducing the space of the secure storage device used to store the software images.

In some instances, a software image may be authenticated during a boot sequence, which may refer to when a virtual machine is powered on or when a software program is opened. During the boot sequence, the virtual machine may calculate a hash that represents the current state of the software image being authenticated. The calculated hash may be compared with an associated hash stored in the tree structure of the secure storage device. For example, if a software program running a second version (e.g., version 2.0) is being authenticated, then the calculated hash may be compared with the hash associated with the second version of the software image that is stored in the secure storage device.

If the compared hashes match, then the software image may be authenticated (e.g., the software image may not have been altered). In such instances, the software image may continue the boot sequence (e.g., the software image may be booted). However, if the compared hashes do not match, then the software image may have been altered. If the software image has been altered, the boot sequence may not be completed, which may prevent the user from interacting with the virtual machine and thus prevent further harm from a potential hacking attack.

Features of the disclosure are initially described in the context of systems as described with reference to FIGS. 1 and 2. Features of the disclosure are described in the context of process flow diagrams, block diagrams, and tree diagrams, as described with reference to FIGS. 3-6. These and other features of the disclosure are further illustrated by and described with reference to an apparatus diagram and a flowchart that relate to authenticating software images as described with reference to FIGS. 7 and 8.

FIG. 1 illustrates an example of a system 100 that supports authenticating software images in accordance with examples as disclosed herein. The system 100 may include an end device 105 and a management server 185.

The end device 105 may include a hypervisor 117 and a storage device 112 The storage device may include a secure component 110 that is configured to securely store at least a device side key 135, software image data 140, and software hash data 155. In some cases, the secure component 110 may store a management key 120. The device side key 135 may be an example of a server root key (SRK) or a set of two keys such as a management public key and a device private key. The server root key or management public key may allow an entity in possession of a copy of the SRK or the management private key to manage the secure component 110 by turning on a security feature of the secure component 10. The storage device 112 may include one or more components associated with a memory device that are operable to perform one or more authentication procedures as discussed herein. The end device 105 may be an example of an infotainment system of a vehicle, a personal computer, a portable electronic device, a server, or any other type of computing device.

The storage device 112 can be integrated into an end device 105, which may include a hypervisor 117 interacting with the storage device 112 The hypervisor 117 can be implemented in hardware or software and is used at least in part to load software images from the storage device 112 for running one or more virtual machines on the end device 105. Prior to running a virtual machine on the end device 105, the hypervisor may verify with the storage device 112 whether the virtual machine's software image has been tampered with, and elect not to run the virtual machine its code has been modified by a malicious actor.

In some examples, the storage device 112 may include one or more software images. Before the software images may run (e.g., before booting the software images), the image(s) may be authenticated to ensure that the underlying code has not been unintentionally altered. During a first portion of authenticating the image(s), the management server 185 or any entity in possession of host side key(s) 137 can issue a secure command to the secure component 110 to calculate and store a hash 115 (e.g., a golden software hash) based on software image data 140 and device side key(s) 135. During a subsequent portion of authenticating the image(s), the storage device 112 may calculate a hash based on the software image data 140 (e.g., the current data) of the image being authenticated. The storage device 112 may compare the hash to the hash 115 to authenticate the software image.

The system 100 may include a management server 150 that is in communication with the end device 105. The management server 150 may include at least a first software image 155, a second software image 160 and host side key(s) 137. The host side key 137 may be an example of a SRK or a set of two keys, such as a management private key and a device public key. When the management server 185 downloads software image data into the storage device 112, it may also issue a secure command to the secure component 110 to generate the hash 115.

In some examples, the management server 185 may elect to produce a patch file representing differences between a first software image 155 and a second software image 160. The management server 185 may then elect to download the patch file into the software image data 140 component of the storage device 112.

Techniques for authenticating software images of the storage device 105 are described herein. In some examples, a hash 115 (e.g., a golden software hash 115) associated with the software image may be generated and stored in a tree structure. Hashes for different versions of the software image may be stored as nodes in the tree structure, and the respective hashes may be generated using the hash of a parent node. The hash 115 stored in the tree structure may then be compared with respective hashes generated by the storage device 112 to authenticate a software image. Using the tree structure for authenticating software images may mitigate malicious attempts to alter the underlying code of a software image on the storage device 112 Moreover, the tree structure may reduce the amount of storage used for verifying a respective software image, while improving the boot time of the end device 105.

Figure 2:
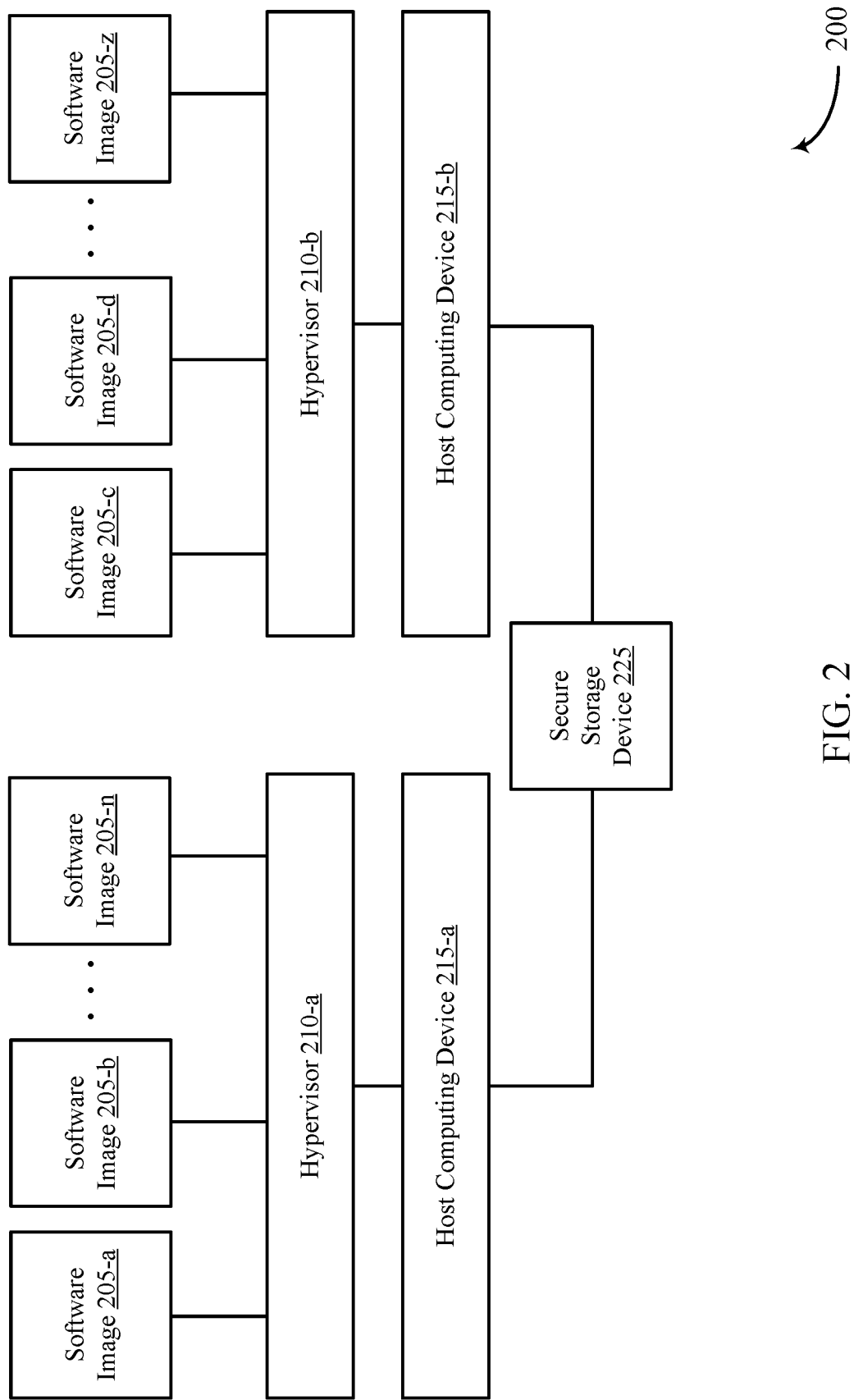
FIG. 2 illustrates an example of a computing system that supports authenticating software images in accordance with examples as disclosed herein.

FIG. 2 illustrates an example of a computing system 200 that supports authenticating software images in accordance with examples as disclosed herein. The computing system 200 may include one or more host computing devices 215, which may run one or more software images 205. A host computing device 215 may be configured to communicate with a secure storage device 225. At least a portion of the secure storage device 225 may be accessible to one or more host computing devices 215 and another portion of the secure storage device 225 may be inaccessible to the one or more host computing devices 215. In some examples, the software images 205 may be authenticated using the methods described herein, which may reduce the time and storage space used to authenticate a respective software image 205.

The computing system 200 may include multiple software images 205 that may be examples of the software images 205. One or more virtual machines may be run by a single host computing device 215. For example, the host computing device 215-a may run virtual machines associated with software images 205-a, 205-b, and 205-n. Additionally or alternatively, the host computing device 215-b may run virtual machines associated with software images 205-c, 205-d, and 205-z. In some examples, n and z may be positive integers such that the host computing device 215-a and host computing device 215-b can run any quantity of virtual machines. The host computing devices 215 may be or may include a server.

Each host computing device 215 may include one or more hypervisors 210. The respective virtual machines may run on the hypervisor 210-a or hypervisor 210-b that are associated with the host computing device 215-a and the host computing device 215-b, respectively. Each hypervisor 210 may be or include computer software, firmware, or hardware configured to run an operating system for each virtual machine. A hypervisor 210 may present the virtual machines with a virtual operating platform and may manage the execution of the operating system run by each virtual machine. Each virtual machine running on a single hypervisor 210 may include software images that are authenticated before being run. In some examples, different virtual machines may run different versions of software images and/or may include guest profiles that may be authenticated before being run.

Each host computing device 215 may include local random access memory to perform the functions described herein. The one or more host computing devices 215 may store information on the secure storage device 225. At least portions of the secure storage device 225 may be accessible by the respective hypervisors 210 (e.g., independent from the hypervisors 210) or may be a hardware component of a respective hypervisor 210. The secure storage device 225 may be configured to store an operating system or software run by the individual virtual machines. In some examples, the secure storage device 225 may store software updates to be provided to one or more virtual machines. The secure storage device 225 may be configured to authenticate the software images 205 as they are initializing or booting up to authenticate whether the software image is secure. Failing the authentication process may be an indication that code associated with the software image 205 has been tampered with or altered in some manner. For example, the secure storage device 225 may authenticate the code of a virtual machine before the virtual machine can boot up.

The host computing devices 215 and/or the virtual machines may communicate with the secure storage device 225. For example, the host computing device 215-a and the host computing device 215-b may each communicate with the secure storage device 225. The host computing devices 215 may be configured to provide data to the secure storage device 225, and the secure storage device 225 may store the data in an internal tree structure that is inaccessible to the host computing devices 215. The secure storage device 225 may be configured to perform one or more security operations and/or one or more authentication operations for any software image 205 or virtual machine associated with the host computing devices 215 or programs run by the software images 205 or virtual machines. The secure storage device 225 may include a portion of memory that is inaccessible to the host computing devices 215, the hypervisor(s) 210, the one or more software images 205, or a combination thereof. The tree may include an initial software image (or a pointer to where the initial software image is stored) and one or more branches having respective nodes. Each node in the tree structure may represent data (e.g., an address of data or a pointer) associated with the base image, and a respective hash used for authentication. The individual hashes may be generated based on a prior hash (e.g., based on the hash of a parent node) in the tree or a different version of the base image (e.g., due to a software update).

In some instances, virtual machines may be susceptible to being hacked. For example, malicious actors may try to gain access to a virtual machine, via a host computing device, by modifying one or more aspects of code. As described herein, the secure storage device 225 may be configured to authenticate a software image 205 before it is used to ensure that the code of the software image 205 has not been tampered with. The secure storage device 225 may use a tree structure for authenticating software images may mitigate such hacking efforts by authenticating a virtual machine, via a node in the tree structure, before the respective virtual machine is booted. Moreover, the tree structure may reduce the amount of storage used for verifying a respective software image, while improving the virtual machine's boot time.

Figure 3:
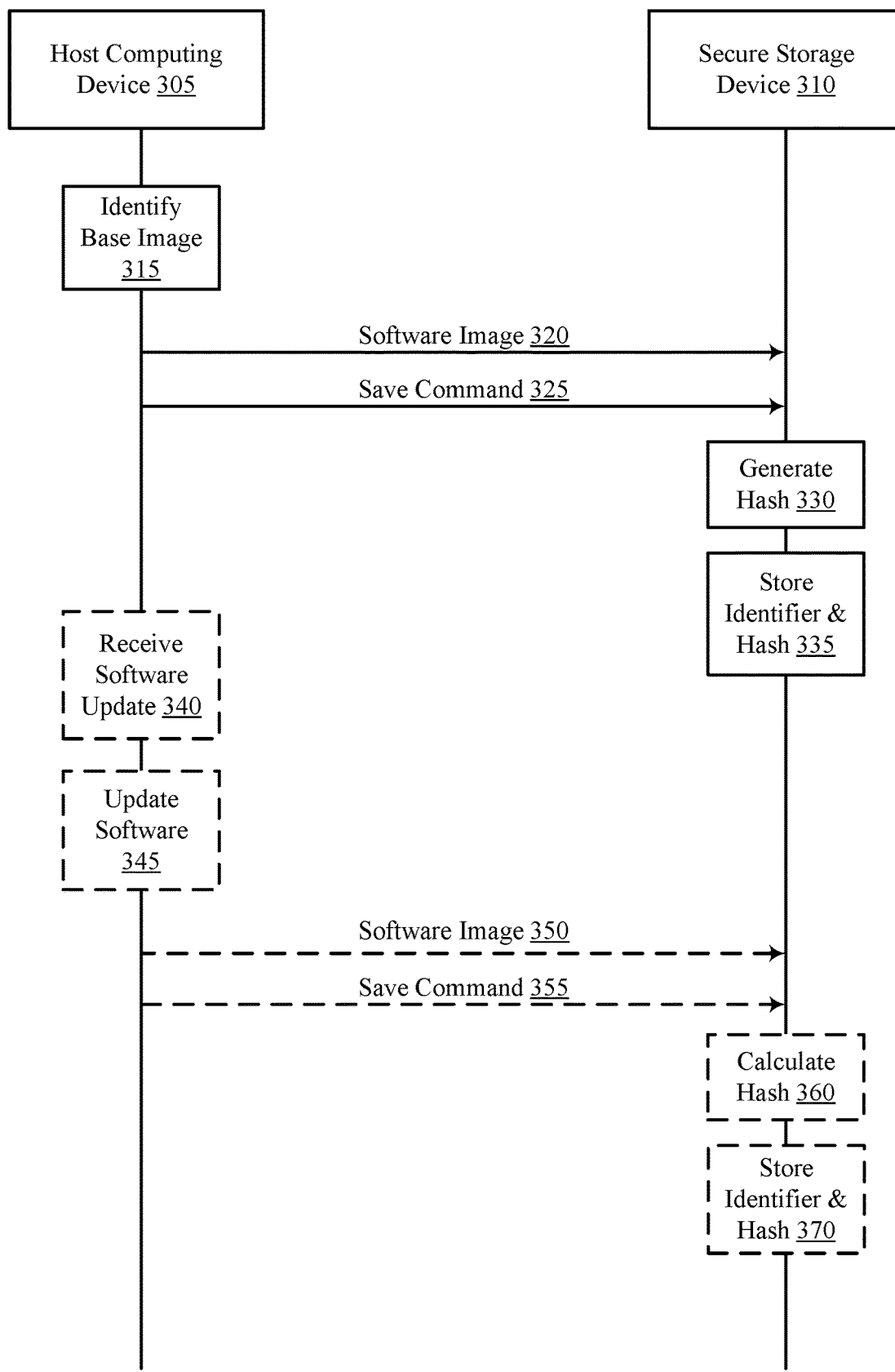
FIG. 3 illustrates an example of a process flow diagram that supports authenticating software images in accordance with examples as disclosed herein.

FIG. 3 illustrates an example process flow diagram 300 that supports authenticating software images in accordance with examples as disclosed herein. The process flow diagram 300 may illustrate the operation of one or more components of the computing system 200 as described with reference to FIG. 2. For example, the process flow diagram 300 may illustrate authenticating a software image 205 as described with reference to FIG. 2. The process flow diagram 300 may illustrate the operations of a host computing device 305 and a secure storage device 310. In some examples, the host computing device 305 may implement aspects of a virtual machine.

In some examples, an image of the virtual machine (e.g., a software image) may be authenticated (e.g., during a boot sequence). The software image may be an example of an operating system, a software program, a virtual machine, or the like. Because virtual machines may be susceptible to hacking, where one or more aspects of code of the software image are altered, it may be beneficial to authenticate the software image before the virtual machine boots. If the code has been altered, and the virtual machine is prevented from booting when the code has been altered, the malicious act may be detected or fixed before a user is able to access the virtual machine. In some examples, to authenticate the virtual machine, hashes of different versions and/or different user profiles associated with the software image may be stored to the secure storage device 310. In some examples, the hashes may be stored with indicators of associated data (e.g., keys).

At 315, the host computing device 305 may identify the software image (e.g., a base image) associated with a virtual machine. The host computing device 305 may store the software image 320 on the secure storage device 310. The host computing device 305 may generate a save command 325 associated with the software image 320 and send that to the secure storage device 310. The software image 320 may be an example of a virtual machine, an operating system, a software program, a set of user settings for an operating system or a program, or the like. The host computing device 305 may transmit the software image 320 and the save command 325 to the secure storage device 310.

The secure storage device 310 may receive the command 325 and the software image 320 from the host computing device 305. The command 325 (e.g., a save command) may be for saving data associated with a software image that allows the secure storage device 310 to authenticate the software image 320 at later initializations or boot-ups. In some examples, the command 325 may be for a base version of a virtual machine. In some examples, the command 325 may be for an updated version of the virtual machine. In some examples, the command 325 may be for saving data associated with a particular user (e.g., a guest user) of the virtual machine for authentication. Additionally or alternatively, the command 325 may indicate a memory address (or range of addresses) to use to save to the software image 320 in the secure storage device 310. Thus, an initial save command 325 may be received when an operating system or software program is first installed, or upon an initial boot sequence or setup of a particular user. In other examples, the host computing device 305 may periodically save a snapshot of a software image associated with virtual to the secure storage device 310. The command 325 may be sent to the secure storage device 310 based on the snapshot being saved.

At 330, the secure storage device 310 may generate a hash (e.g., a cryptographic hash, a first hash) of the software image 320 based on receiving the save command 325. For example, the software image 320 could be a base image as described herein, and the hash could be generated based on the data or code associated with the base image. The hash could be generated, for example, using a Secure Hash Algorithm (SHA).

The secure storage device 310 may also generate an identifier associated with the software image 320 and/or the hash of the software image 320. The secure storage device 310 may identify data associated with the software image 320 and generate an indication to reduce an amount of information being stored in the tree structure. In some examples, the secure storage device 310 may identify an address of the underlying data (e.g., an address range) and use that as part of the indication. The identifier may be saved to the secure storage device 310 and may be used for authenticating a software image of the virtual machine. In some examples, some or all of the indication or the key may be generated by the host computing device 305 and sent to the secure storage device 310. The identifier may be associated with a first version (e.g., version 1.0) of an operating system or particular software program, or may be associated with an initial data structure of a particular user. Such an identifier may be referred to as a "base image" and may be an initial node in a tree structure stored to the secure storage device 310. Any additional nodes stored to the tree structure may depend on the base image.

At 335, the hash and the identifier may be stored in a portion of the secure storage device 310 that is inaccessible to the host computing device 305. The hash generated by the secure storage device 310 may be an example a hash that is used to validate other hashes during an initialization procedure of the software image. Thus, the hash generated as part a save command 325 is stored for future authentication procedures and is not accessible by the host computing device. The inaccessibility of the hash may prevent hackers from altering the stored hash and thus make the authentication procedure more reliable. The indication may include a pointer to memory where the associated software image is stored. The indication may include information about how the associated software image relates to other software images of the same program or virtual machine. For example, the identifier may indicate that a software image is an updated version of another base version. Additional details about the relationships between software versions is described with reference to FIGS. 4 and 5. The portion of the secure storage device 310 where the identifier and the hash are stored may include non-volatile memory and may be inaccessible to the host computing device 305. Due to the identifier and hash being inaccessible to the host computing device 305, the data may be hidden from malicious actors while still being accessible to the secure storage device 310 during an authentication process.

At 340, the host computing device 305 may optionally receive one or more software update for a software image. For example, the host computing device 305 may receive a software update for an operating system or a software program associated with the virtual machine. When the host computing device 305 receives the software update, the update may installed.

At 345, the software update may be optionally performed on the virtual machine. In some examples, during the software update the virtual machine may receive (e.g., download) an entire file that includes the updated version of the software image. In other examples, the host computing device 305 may receive a file (e.g., a patch file) that includes only differences between the base image and the updated version. In either instance, the software update may be performed on the virtual machine.

In some examples (not shown), the software update may be provided to the host computing device 305 by an external server. As discussed herein, malicious actors may attempt to gain access to a virtual machine via a host computing device 305. The secure storage device 310 may generate an initial hash of the software image associated with the software update and use that hash to verify the contents of the software update (e.g., authenticate the file) during an initialization procedure.

The host computing device 305 may transmit the software image 350 associated with the software update and the save command 355 to the secure storage device 310. The software image 350 may be related to the base image 320, and may include a patch to apply to the base image 320 to complete a software update.

At 360, the secure storage device 310 may generate a hash (e.g., a cryptographic hash, a first hash) of the software image 350 based on receiving the save command 355. The secure storage device 310 may also generate an identifier associated with the software image 350 and/or the hash of the software image 350. When generating a hash of a software image 350 is an updated version of a base image (e.g., software image 320), the secure storage device 310 may use the first hash and at least portions of the software image 350 to generate the new hash, rather than using software image 320 and software image 350 to generate the new hash.

The secure storage device 310 may identify data associated with the software image 350 and generate an indication to reduce an amount of information being stored in the tree structure. In some examples, the secure storage device 310 may identify an address of the underlying data (e.g., an address range) and use that as part of the indication. The identifiers may be saved to the secure storage device 310 and may be used for authenticating a software image of the virtual machine. In some examples, some or all of the identifiers may be generated by the host computing device 305 and sent to the secure storage device 310. Because this is a software update, the identifier may be associated with a second or subsequent version (e.g., version 2.0) of an operating system or particular software program. Such an identifier may be a secondary node in a tree structure stored to the secure storage device 310. As described with reference to FIG. 5, an indication of a secondary node may include information linking the secondary node with other nodes in the tree structure.

At 370, the hash and the identifier may be stored in a portion of the secure storage device 310 that is inaccessible to the host computing device 305. The hash generated by the secure storage device 310 may be an example a hash that is used to validate other hashes during an initialization procedure of the software image. Thus, the hash generated as part a save command 355 is stored for future authentication procedures and is not accessible by the host computing device. The inaccessibility of the hash may prevent hackers from altering the stored hash and thus make the authentication procedure more reliable. The indication may include a pointer to memory where the associated software image is stored. The indication may include information about how the associated software image relates to other software images of the same program or virtual machine. For example, the identifier may indicate that a software image is an updated version of another base version. Additional details about the relationships between software versions is described with reference to FIGS. 4 and 5. The portion of the secure storage device 310 where the identifier and the hash are stored may include non-volatile memory and may be inaccessible to the host computing device 305. Due to the identifier and hash being inaccessible to the host computing device 305, the data may be hidden from malicious actors while still being accessible to the secure storage device 310 during an authentication process.

In some examples, the command 355 may be for saving data associated with an identified guest user of the virtual machine. In some examples, a guest profile may be established on the virtual machine, and the save command may be for a software image associated with the guest. In some examples, the secure storage device 310 may update one or more stored identifiers and/or hashes. For example, a software image may experience a change in data that is not associated with a software update. In such instances, the change in data may be communicated to the secure storage device 310, and the secure storage device 310 may update any stored identifiers associated with the software image. In other examples, the secure storage device 310 may calculate (e.g., recalculate) one or more hashes associated with the updated data.

Although FIG. 3 illustrates saving entries of a single virtual machine to a tree structure of the secure storage device 310, entries of multiple virtual machines may be saved to the secure storage device 310 as part of a same or different tree structures. For example, some or all virtual machines that are associated with a software image and are running on the host computing device 305 may store entries (e.g., nodes) in the tree structure. Examples of the entries and the tree structure are described below with reference to FIGS. 4 and 5.

Figure 4:
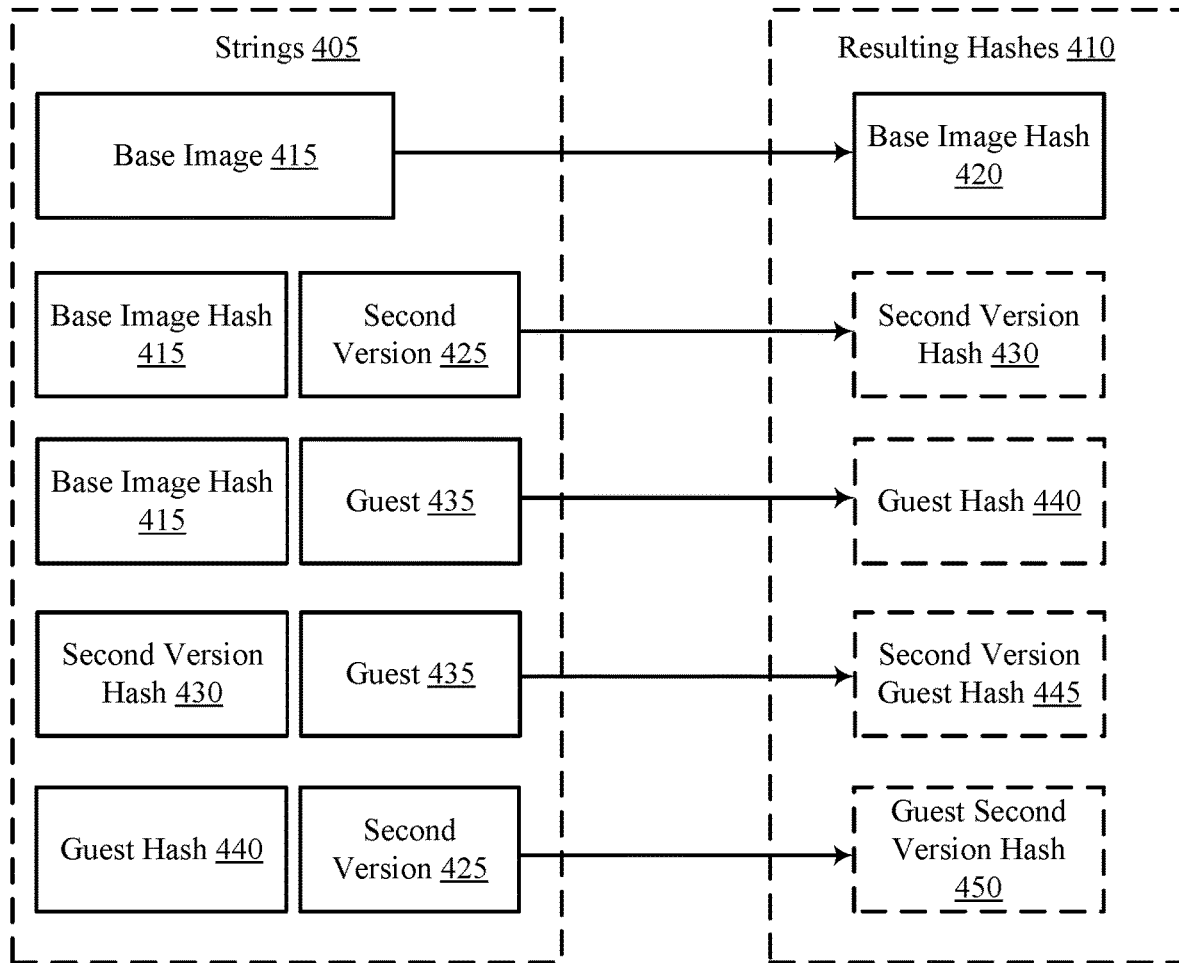
FIG. 4 illustrates an example of a block diagram that supports authenticating software images in accordance with examples as disclosed herein.

FIG. 4 illustrates an example of a block diagram 400 that supports authenticating software images in accordance with examples as disclosed herein. The block diagram 400 may illustrate generating one or more hashes that are stored to a secure storage device (e.g., a secure storage device 310 as described with reference to FIG. 3). For example, the block diagram 400 may illustrate applying a hash algorithm to different strings 405, and the resulting hashes 410 based on applying the hash algorithm. In some examples, the hash algorithm may be applied in response to a command (e.g., a save command) as described with reference to FIG. 3.

Some updates to code of the virtual machines may be relatively small when compared to a size of the base image. If a hash of the base image is to be calculated every time a version of the virtual machine is authenticated it use large amounts of computing resources. To reduce the amount of computing resources to generate hashes in response to a save command (as described with reference to FIG. 3) or a measure command (as described with reference to 6), the hashes of earlier versions may be used to generate the hashes of later versions. This may reduce the amount of computational resources used for hashing because it may reduce the amount of information being hashed.

In a first example, a hash algorithm (e.g., a SHA) may be applied to a base image 415. A base image may refer to a first version (e.g., version 1.0) of a software image, or may be associated with an initial data structure of a particular user, operating system, or software program. When the hash algorithm is applied to the base image 415, the resulting hash may be the base image hash 420 (e.g., Hash_b1). In some examples, the base image hash 420 may be stored to a secure storage device as described herein.

In a second example, a hash algorithm (e.g., a SHA) may be applied to a string 405 that includes the base image hash 420 and a second version 425 of the software image, a data structure of a particular user, operating system, or software program. The second version 425 may represent a modified version of the base image 415. Accordingly, in a tree structure described herein, the second version 425 may depend from the base image. To generate the second image hash 430 (e.g., Hash_b1v2), the hash of the base image (e.g., base image hash 420) and the code of the second version 425 may be used. In some examples, the second image hash 430 may be stored to a secure storage device as described herein.

In another example, a hash algorithm (e.g., a SHA) may be applied to a string 405 that includes the base image hash 420 and a data structure associated with a guest image 435. The guest image 435 may represent a modified version of the base image 415. Accordingly, in a tree structure described herein, the guest image 435 may depend from the base image. To generate the guest hash 440 (e.g., Hash_b1g1), the hash of the base image (e.g., base image hash 420) and the code of the guest 435 may be used. In some examples, the guest hash 440 may be stored to a secure storage device as described herein.

A hash algorithm (e.g., a SHA) may be applied to a string 405 that includes the guest hash 440 and second version hash 430 and a data structure associated with a guest image 435. The guest image 435 may represent a modified version of the base second version 425. Accordingly, in a tree structure described herein, the guest image 435 may depend from the second version 425. To generate the second version guest hash 445 (e.g., Hash_b1v2g1), the hash of the sever version 425 (e.g., second version hash 430) and the code of the guest 435 may be used. In some examples, the guest version guest hash 445 may be stored to a secure storage device as described herein.

Additionally or alternatively, a hash algorithm (e.g., a SHA) may be applied to a string that includes the guest hash 440 and the second version 425. The second version 425 may represent a modified version of the base image 415. Accordingly, in a tree structure described herein, the second version may depend from the base image 415. To generate the guest second version hash 450 (e.g., Hash_b1g1v2), the hash of the guest 440 (e.g., guest hash 440) and the code of the second version 425 may be used. In some examples, the guest second version hash 450 may be stored to a secure storage device as described herein.

Figure 5:
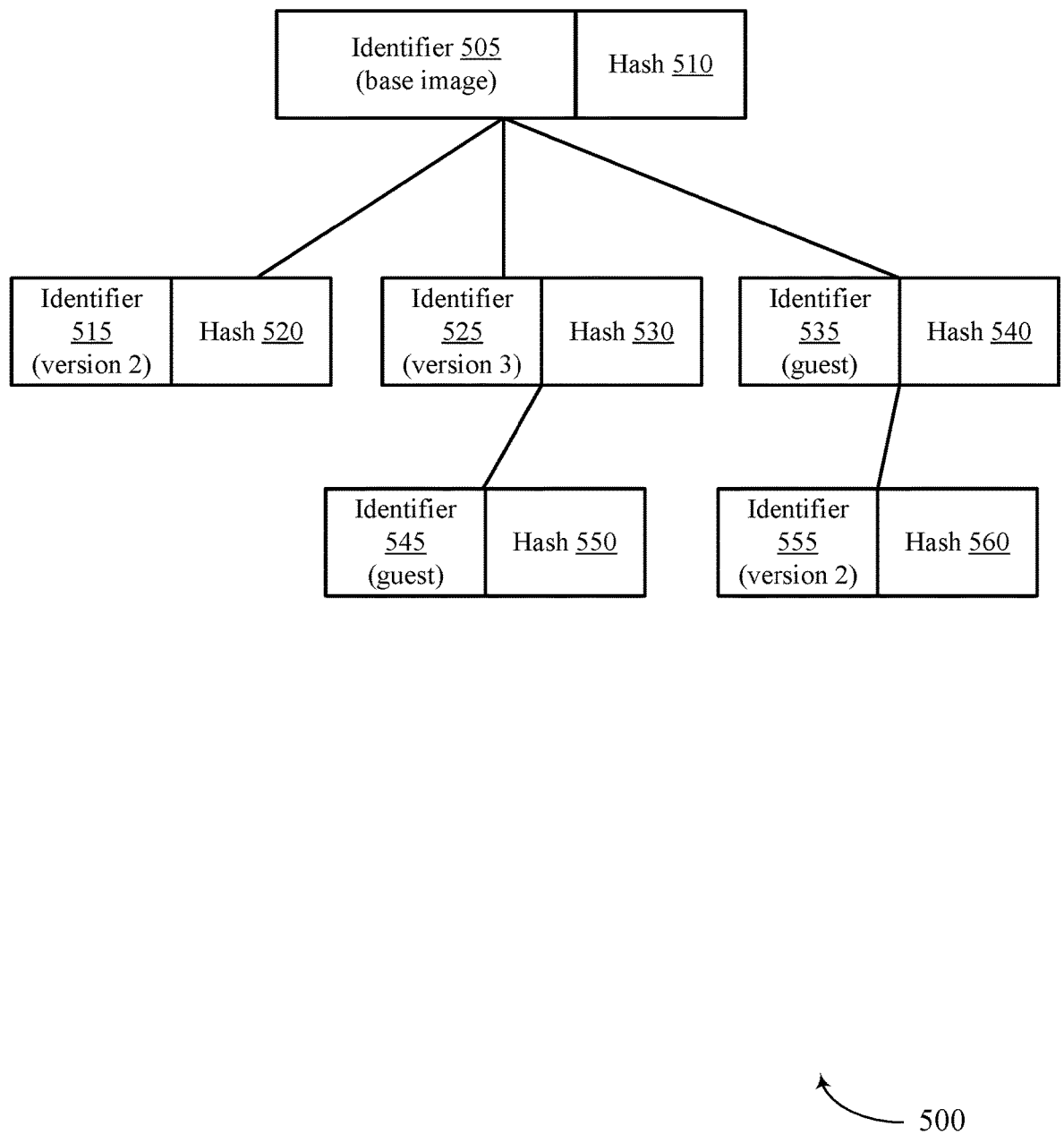
FIG. 5 illustrates an example of a tree diagram that supports authenticating software images in accordance with examples as disclosed herein.

FIG. 5 illustrates an example of a tree diagram 500 that supports authenticating software images in accordance with examples as disclosed herein. The tree diagram 500 may illustrate one or more hashes (e.g., the resulting hashes 410 as described with reference to FIG. 4) and associated identifiers that are saved to a secure storage device (e.g., a secure storage device 310 as described with reference to FIG. 3). In some examples, the hashes and identifiers may be stored in response to a virtual machine receiving one or more commands (e.g., save commands) as described with reference to FIG. 3.

The tree structure may store an identifier 505 and a hash 510 that are associated with a base image. As discussed herein, a base image may refer to a first version (e.g., version 1.0) of a software image, or may be associated with an initial data structure of a particular user, operating system, or software program. When the hash algorithm is applied to the base image (e.g., to the identifier 505), the resulting hash may be hash 510, which may be an example of the base image hash 420 (e.g., Hash_b1) as described with reference to FIG. 4. The identifier 505 and the hash 510 may be stored as an initial node in the tree structure.

In some examples, the data structure of the base image may be updated to a second version (e.g., version 2.0). Thus the tree structure may store an identifier 515 and a hash 520 associated with the updated image. As discussed herein, the hash 520 may be generated by applying a hash algorithm to the base image hash (e.g., hash 510) and code associated with the second version. The resulting hash may be hash 520, which may be an example of the second image hash 430 (e.g., Hash_b1v2) as described with reference to FIG. 4.

Because the second version may be a modified version of the base image, the identifier 515 may indicate that the node is a dependent node from the base node associated with the base image.

Additionally or alternatively, the data structure of the base image may be updated to a third version (e.g., version 3.0). Thus the tree structure may store an identifier 525 and a hash 530 associated with the updated image. As discussed herein, the hash 520 may be generated by applying a hash algorithm to the base image hash (e.g., hash 510) and code associated with the third version. The resulting hash may be hash 530, which may be an example of a third image hash 530 (e.g., Hash_b1v3). Because the third version may be a modified version of the base image, the identifier 525 may indicate that the node is a dependent node from the base node associated with the base image.

The data structure of the base image may be updated to include a guest profile. Thus the tree structure may store an identifier 535 and a hash 540 associated with the updated image. The hash 540 may be generated by applying a hash algorithm to the base image hash (e.g., hash 510) and code associated with the guest profile. Accordingly, the hash algorithm may be applied to the hash 510 and to the identifier 535. The resulting hash may be hash 540, which may be an example of the guest hash 440 (e.g., Hash_b1g1) as described with reference to FIG. 4. Because the guest profile may be a modified version of the base image, the identifier 535 may indicate that the node is a dependent node from the base node associated with the base image.

The data structure of the third version of the base image may be updated to include a guest profile. Thus the tree structure may store an identifier 545 and a hash 550 associated with the updated image. The hash 545 may be generated by applying a hash algorithm to the third version hash (e.g., hash 530) and code associated with the guest profile. Accordingly, the hash algorithm may be applied to the hash 530 and to the identifier 545. The resulting hash may be hash 545, which may be an example of a third version guest hash (e.g., Hash_v3g1). Because the third version guest profile may be a modified version of the third version and the base image, the key 545 may indicate that the node is a dependent node from the node associated with the third version, which is a dependent node from the base node associated with the base image.

The data structure of the guest profile of the base image may be updated to a second version. Thus the tree structure may store an identifier 555 and a hash 560 associated with the updated image. The hash 560 may be generated by applying a hash algorithm to the guest hash (e.g., hash 540) and code associated with the second version. Accordingly, the hash algorithm may be applied to the hash 540 and to the identifier 555. The resulting hash may be hash 560, which may be an example of a guest second version hash 450 (e.g., Hash_g1v2) as described with reference to FIG. 4. Because the second version may be a modified version of the guest profile, the key 555 may indicate that the node is a dependent node from the node associated with the guest profile, which is a dependent node from the base node associated with the base image.

Each of the identifiers and hashes described with reference to FIG. 5 may be stored to a secure storage device, such as a secure storage device 310 as described with reference to FIG. 3. In some examples, it may be desirable to delete one or more identifiers from the tree diagram due to space constraints or due to a version or user profile being outdated. In some examples, an erase command may be issued to delete one or more nodes from the tree diagram.

In a first example, an erase command may be issued to erase the node associated with the identifier 515 and the hash 520. Because the node does not include any additional dependent nodes (e.g., the node only depends from the base image node), the erase command may remove the key and the hash 520 from the tree structure. In an additional example, an erase command may be issued to erase the node associated with the identifier 525 and the hash 530. Because the node may be an intermediate node (e.g., the node associated with the identifier 545 and the hash 550 depends from the node associated with the erase command), the erase command may be ignored. The erase command may be ignored, for example, until the node associated with the identifier 545 and the hash 550 is removed from the tree structure.

In yet another example, an erase command may be issued to erase the node associated with the identifier 535 and the hash 540. Because the node may be an intermediate node (e.g., the node associated with the identifier 555 and the hash 560 depends from the node associated with the erase command), the erase command may be configured to initiate a restructuring of the nodes in the tree structure. For example, the hash 560 may be regenerated (e.g., recalculated) using the hash 510 such that the node associated with the identifier 555 and the hash 560 depends from the base image. Once the hash 560 is regenerated, the associated node may depend from the base image and the intermediate node (e.g., the node associated with the identifier 535 and the hash 540) may be deleted.

Figure 6:
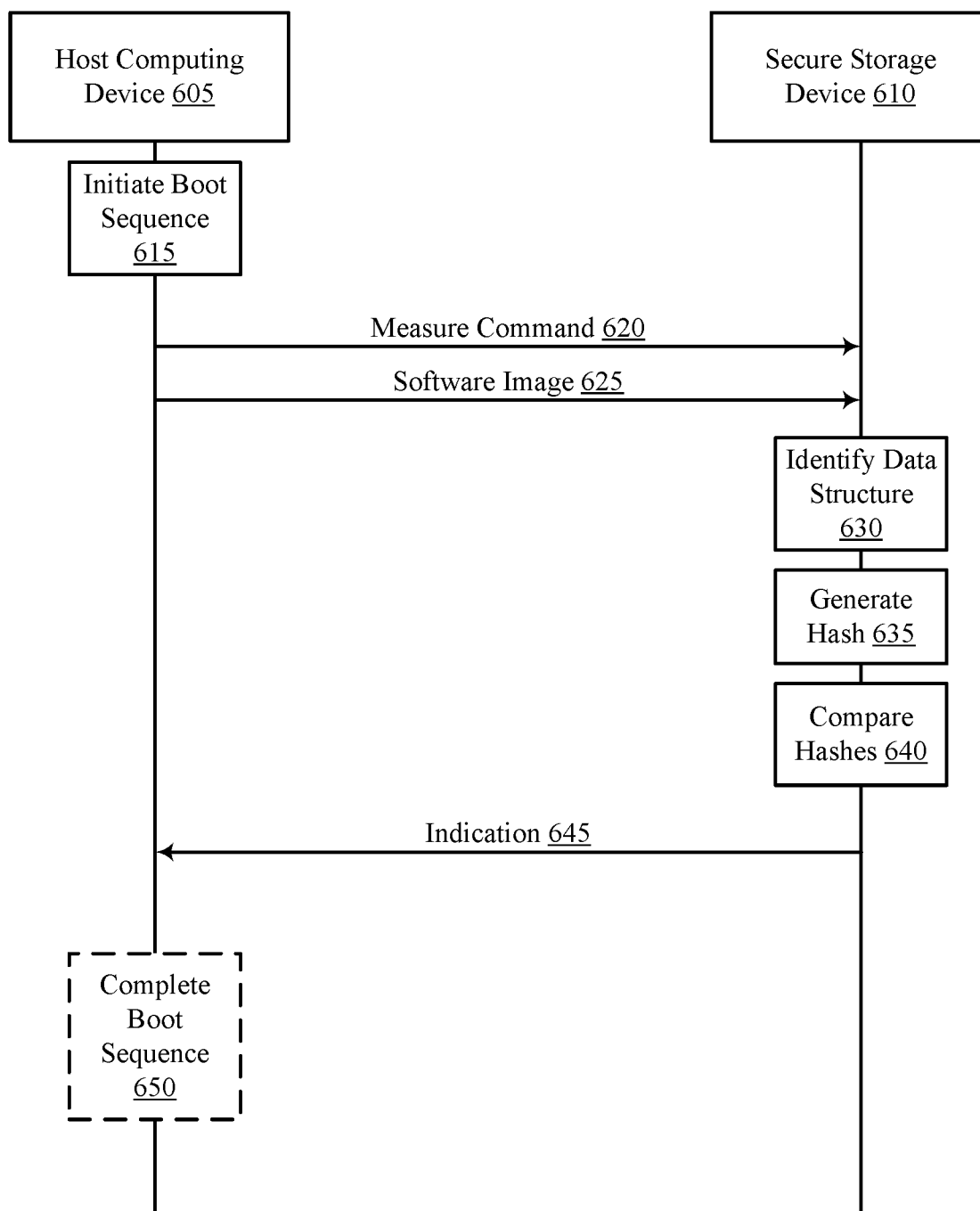
FIG. 6 illustrates an example of a process flow diagram that supports authenticating software images in accordance with examples as disclosed herein.

FIG. 6 illustrates an example process flow diagram 600 that supports authenticating software images in accordance with examples as disclosed herein. The process flow diagram 600 may illustrate the operation of one or more components of the computing system 200 as described with reference to FIG. 2. For example, the process flow diagram 600 may illustrate authenticating a software image 205 as described with reference to FIG. 2. The process flow diagram 600 may illustrate the operations of a host computing device 605 and a secure storage device 610.

A secure storage device may be configured to authenticate software images for a host computing device. To authenticate software images, the secure storage device may be capable of performing a save command, an erase command, a measure command, other commands, or combinations thereof. As described with reference to FIG. 3, the save command may be used to generate and securely store hashes to be used for comparisons during a boot sequence. As described with reference to FIG. 5, the erase command may be used to delete hashes that have been stored for use in authentication procedure. As described herein, the measure command may be used to authenticate a software image during an initialization procedure (e.g., a boot sequence) by generating a hash of the software image and comparing that hash to a stored hash (e.g., stored using the save command).

In some examples, the host computing device 605 may include a software image to be authenticated (e.g., during a boot sequence). The software image may be or may include an operating system, a software program, or the like. Because virtual machines may be susceptible to hacking, where one or more aspects of code of the software image are altered, it may be beneficial to authenticate the software image before the virtual machine boots. If the code has been altered, and the virtual machine is prevented from booting when the code has been altered, the malicious act may be detected or fixed before a user is able to access the virtual machine. In some examples, the program associated with the software image may be prevented from running so that additional damage done by the hacking does not occur. In some examples, the software image may be authenticated using a hash generated and stored to a tree structure as described with reference to FIGS. 3 through 5. In some instances, a boot sequence may be initiated (or not initiated) based on the authentication process.

At 615, a boot sequence may optionally be initiated at the host computing device 605. A boot sequence may be initiated when the host computing device 605 is powered on or when a virtual machine associated with the host computing device 605 is activated, for example when a user (or a guest) attempts to access the virtual machine, or when a software program is initiated (e.g., opened). In some examples, an indication may be transmitted to the secure storage device 610 when a boot sequence is initiated. The indication may initiate an authentication process for software image (e.g., virtual machine) being initiated.

The host computing device 605 may transmit a measure command 620 based on initiating the boot sequence. The command 620 (e.g., a measure command) may be for initiating an authentication process of the software image of the virtual machine. For example, the command 620 may be for authenticating an operating system associated with the virtual machine. In other examples, the measure command 620 may be for authenticating a user profile (e.g., a guest profile) of the virtual machine or authenticating a particular software program installed on the host computing device 605 The command 620 may include an indication of the software image being authenticated (e.g., the version of the software hash being authenticated). The host computing device 605 may also transmit the software image 625 (or an indication of the where the software image 625 is stored) to the secure storage device 610 as part of sending the measure command 620. The features described with references to 630, 635, and 640 may be an example of an authentication procedure performed by the secure storage device 610.

At 630, based on receiving the command 620, the secure storage device 610 may identify software image 625 associated with the command 620. For example, the secure storage device 610 may determine what node in a stored tree structure or what stored hash is associated with the measure command. The secure storage device 610 may make this determination based on information included in the measure command 620, the software image 625 itself, or a combination thereof. The command 620 may identify a particular operating system, a particular software program, a particular user, or the like. In some examples, the host computing device 605 may identify a location of the underlying software image (e.g., an address range) for authentication.

At 635, the host computing device 605 may generate a hash (e.g., a cryptographic hash, a second hash) of the software image 625. The hash generated in response to the measure command 620 may be a hash of the code associated with the software image 625 that is attempting to be initiated. Thus, if the code associated with the software image 625 has been altered from its intended state (e.g., from its correct state, due to a malicious act) then the authentication procedure may fail. The hash generated at 635 may be generated using a same algorithm used to generate the hash stored in the secure storage device 310 in response to a save command as described with reference to FIG. 3. For example, the hash could be generated using a SHA. In some examples, the hash may be generated by the host computing device 605 and may be communicated to the secure storage device 610 with the measure command 620.

At 640, the secure storage device 610 may compare the calculated hash with the stored hash (e.g., the golden hash).

In response to a save command (as described with reference to FIG. 3), the secure storage device may store the hash in a portion of memory that is inaccessible to the host computing device. By having the secure storage device store the first hash in the inaccessible memory and having the secure storage device then perform the authentication procedure (e.g., compare the calculated hash with an expected hash), the authentication is less likely to be exposed to malicious attacks from hackers. The secure storage device 610 may compare the hash generated at 635 (e.g., a second hash) and a corresponding hash stored in the secure storage device 610 (e.g., a golden hash).

The secure storage device 610 may transmit an indication 645 of a result of comparing the hashes to the host computing device. The indication may include whether the first hash and the second hash match. For example, if the hashes match then the secure storage device 610 may transmit a command to the host computing device 605 to continue (e.g., perform or finish) the boot sequence. In other examples, if the hashes do not match then the secure storage device 610 may transmit a command to the host computing device 605 to end the boot sequence (e.g., to not boot the software image). In some examples, if the hashes do not match then the secure storage device 610 may refrain from transmitting any additional information to the host computing device 605 as part of the boot sequence. In such examples, refraining from transmitting information in response to other commands in the boot sequence may cause the boot sequence to fail and for the virtual machine or program to not launch. In some examples, the software image may not be authenticated (e.g., the boot sequence may not be completed) when the secure storage device 610 does not transmit a boot command to the host computing device 605.

At 650, the host computing device 605 may attempt to continue the boot sequence of the software image. In some examples, the host computing device 605 may boot the software image based on the first and second hashes matching. Additionally or alternatively, when the hashes match, the host computing device 605 may receive an indication from the secure storage device 610 to continue the boot sequence. In other examples, at 655 the host computing device 605 may refrain from booting the software image based on the first and second hashes not matching. In some examples, the host computing device 605 may attempt to continue the boot sequence and may continue to issue boot-up commands and requests for data to the secure storage device 610. In such cases, if the authentication failed, the secure storage device 610 may refrain from fulfilling the requests for data, thereby causing the boot sequence to fail. The host computing device 605 may refrain from booting the software image based on receiving a command from the secure storage device 610 or based on not receiving any commands from the secure storage device 610.

Figure 7:
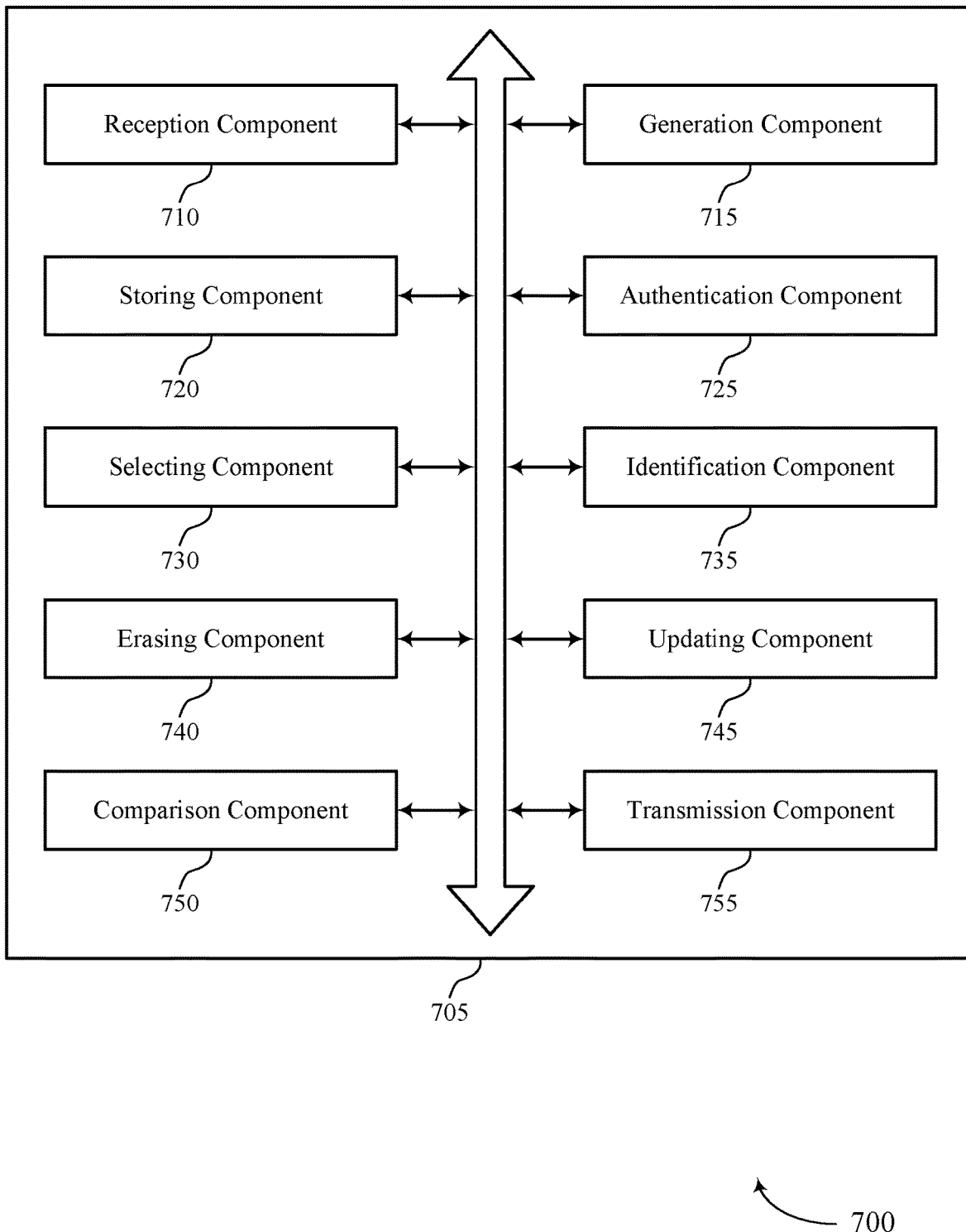
FIG. 7 shows a block diagram of a memory device that supports authenticating software images in accordance with examples as disclosed herein.

FIG. 7 shows a block diagram 700 of a memory device 705 that supports authenticating software images in accordance with examples as disclosed herein. The memory device 705 may be an example of aspects of a memory device as described with reference to FIGS. 1 through 6. The memory device 705 may include a reception component 710, a generation component 715, a storing component 720, an authentication component 725, a selecting component 730, an identification component 735, an erasing component 740, an updating component 745, a comparison component 750, and a transmission component 755. Each of these components may communicate, directly or indirectly, with one another (e.g., via one or more buses).

The reception component 710 may receive a first software image and a first command to store the first software image in a memory device. In some examples, the reception component 710 may receive a second software image based on the first software image and a second command to store the second software image in the memory device. In some examples, the reception component 710 may receive the first command for storing the first hash, storing the second hash, or both based on generating the second hash. In some examples, the reception component 710 may receive an erase command to erase the stored second hash.

The generation component 715 may generate a first hash of the first software image based on first data associated with the first software image and the first command. In some examples, the generation component 715 may generate a second hash associated with the second software image based on the first hash of the first software image and the second command. In some examples, the generation component 715 may generate a first indication of the first software image based on receiving the first software image, where storing the first hash and the first indication is based on generating the first indication.

In some examples, the generation component 715 may generate the first indication of the relationship between the second software image and the first software image based on receiving the second software image, where storing the second hash and the first indication is based on generating the first indication. In some examples, the generation component 715 may generate a third hash of the third data based on receiving the third command.

The storing component 720 may store, in a non-volatile memory component of the memory device based on generating the first hash, the first hash. In some examples, the storing component 720 may store, in the non-volatile memory component of the memory device based on generating the second hash, the second hash and a first indication of a relationship of the second software image with the first software image. In some examples, the storing component 720 may store the third hash of the third data to a volatile memory component of the memory device based on generating the third hash.

The authentication component 725 may authenticate, by the memory device, the second software image by comparing the second hash with a calculated hash of the first hash and third data associated with the second software image. In some examples, authenticating the second software image includes determining whether the third hash of the third data is the same as the second hash associated with the second software image based on comparing the third hash of the third data with the second hash associated with the second software image.

In some examples, the authentication component 725 may refrain from authenticating the second software image by generating a notification based on determining the third hash of the third data is different than the second hash, where the notification includes an indication that the third data is different than the second hash. In some examples, the authentication component 725 may refrain from authenticating the second software image by issuing a fourth command based on determining the third hash of the third data is different than the second hash associated with the second software image, where the fourth command includes an instruction to refrain from initiating a boot sequence.

The selecting component 730 may select the first hash to use for generating the second hash based on the relationship between the second software image and the first software image, where generating the second hash is based on selecting the first hash.

The identification component 735 may identify the third data based on receiving the first command, where the third data includes data that is included in second data associated with the second software image and is not included in the first data. In some examples, the identification component 735 may identify a change in second data associated with the second software image relative to the first data.

The erasing component 740 may erase the second hash and the first indication of the relationship of the second software image with the first software image stored in the non-volatile memory component based on receiving the erase command. In some examples, the erasing component 740 may erase one or more additional hashes and indications of a respective relationship of the additional hash with the second software image before erasing the second hash and the first indication of the relationship of the second software image with the first software image.

The updating component 745 may update the first indication of the relationship of the second software image with the first software image based on identifying the change in the second data.

The comparison component 750 may compare the third hash of the third data with the second hash associated with the second software image based on storing the third hash of the third data to the volatile memory component.

The transmission component 755 may transmit the notification to a host system. In some examples, the transmission component 755 may issue a fourth command based on determining the third hash of the third data matches the second hash associated with the second software image, where the fourth command includes an instruction to initiate a boot sequence.

Figure 8:
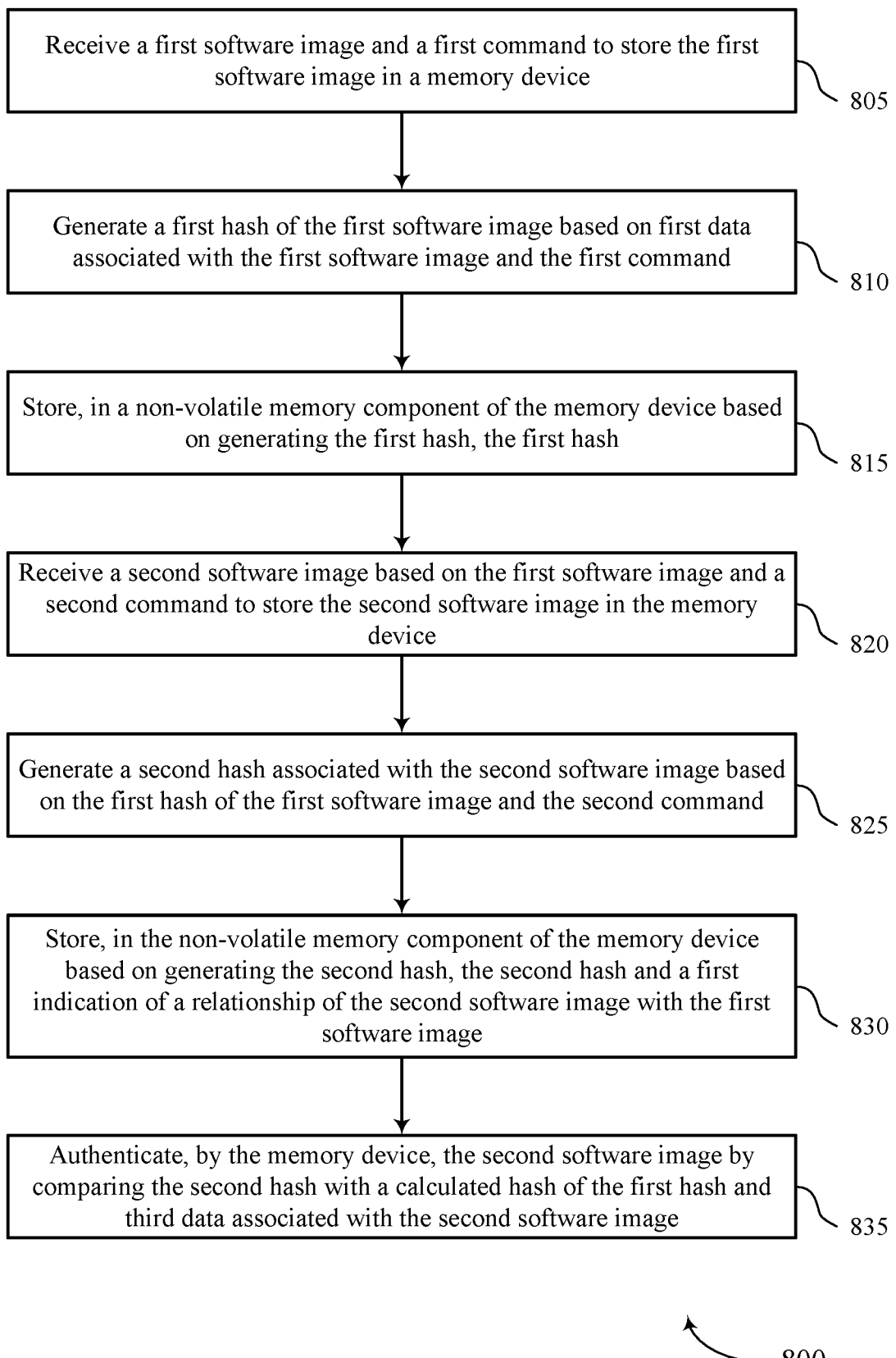
FIG. 8 shows a flowchart illustrating a method or methods that support authenticating software images in accordance with examples as disclosed herein.

FIG. 8 shows a flowchart illustrating a method or methods 800 that supports authenticating software images in accordance with examples as disclosed herein. The operations of method 800 may be implemented by a memory device or its components as described herein. For example, the operations of method 800 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

At 805, the memory device may receive a first software image and a first command to store the first software image in a memory device. The operations of 805 may be performed according to the methods described herein. In some examples, aspects of the operations of 805 may be performed by a reception component as described with reference to FIG. 7.

At 810, the memory device may generate a first hash of the first software image based on first data associated with the first software image and the first command. The operations of 810 may be performed according to the methods described herein. In some examples, aspects of the operations of 810 may be performed by a generation component as described with reference to FIG. 7.

At 815, the memory device may store, in a non-volatile memory component of the memory device based on generating the first hash, the first hash. The operations of 815 may be performed according to the methods described herein. In some examples, aspects of the operations of 815 may be performed by a storing component as described with reference to FIG. 7.

At 820, the memory device may receive a second software image based on the first software image and a second command to store the second software image in the memory device. The operations of 820 may be performed according to the methods described herein. In some examples, aspects of the operations of 820 may be performed by a reception component as described with reference to FIG. 7.

At 825, the memory device may generate a second hash associated with the second software image based on the first hash of the first software image and the second command. The operations of 825 may be performed according to the methods described herein. In some examples, aspects of the operations of 825 may be performed by a generation component as described with reference to FIG. 7.

At 830, the memory device may store, in the non-volatile memory component of the memory device based on generating the second hash, the second hash and a first indication of a relationship of the second software image with the first software image. The operations of 830 may be performed according to the methods described herein. In some examples, aspects of the operations of 830 may be performed by a storing component as described with reference to FIG. 7.

At 835, the memory device may authenticate, by the memory device, the second software image by comparing the second hash with a calculated hash of the first hash and third data associated with the second software image. The operations of 835 may be performed according to the methods described herein. In some examples, aspects of the operations of 835 may be performed by an authentication component as described with reference to FIG. 7.

In some examples, an apparatus as described herein may perform a method or methods, such as the method 800. The apparatus may include features, means, or instructions (e.g., a non-transitory computer-readable medium storing instructions executable by a processor) for receiving a first software image and a first command to store the first software image in a memory device, generating a first hash of the first software image based on first data associated with the first software image and the first command, storing, in a non-volatile memory component of the memory device based on generating the first hash, the first hash, receiving a second software image based on the first software image and a second command to store the second software image in the memory device, generating a second hash associated with the second software image based on the first hash of the first software image and the second command, storing, in the non-volatile memory component of the memory device based on generating the second hash, the second hash and a first indication of a relationship of the second software image with the first software image, and authenticating, by the memory device, the second software image by comparing the second hash with a calculated hash of the first hash and third data associated with the second software image.

Some examples of the method 800 and the apparatus described herein may further include operations, features, means, or instructions for generating a first indication of the first software image based on receiving the first software image, where storing the first hash and the first indication may be based on generating the first indication.

Some examples of the method 800 and the apparatus described herein may further include operations, features, means, or instructions for generating the first indication of the relationship between the second software image and the first software image based on receiving the second software image, where storing the second hash and the first indication may be based on generating the first indication.

Some examples of the method 800 and the apparatus described herein may further include operations, features, means, or instructions for selecting the first hash to use for generating the second hash based on the relationship between the second software image and the first software image, where generating the second hash may be based on selecting the first hash.

Some examples of the method 800 and the apparatus described herein may further include operations, features, means, or instructions for receiving the first command for storing the first hash, storing the second hash, or both based on generating the second hash, and identifying the third data based on receiving the first command, where the third data includes data that may be included in second data associated with the second software image and may be not included in the first data.

Some examples of the method 800 and the apparatus described herein may further include operations, features, means, or instructions for receiving an erase command to erase the stored second hash, and erasing the second hash and the first indication of the relationship of the second software image with the first software image stored in the non-volatile memory component based on receiving the erase command.

Some examples of the method 800 and the apparatus described herein may further include operations, features, means, or instructions for erasing one or more additional hashes and indications of a respective relationship of the additional hash with the second software image before erasing the second hash and the first indication of the relationship of the second software image with the first software image.

Some examples of the method 800 and the apparatus described herein may further include operations, features, means, or instructions for identifying a change in second data associated with the second software image relative to the first data, and updating the first indication of the relationship of the second software image with the first software image based on identifying the change in the second data.

In some examples of the method 800 and the apparatus described herein, a set of hashes of a set of software images stored in the non-volatile memory component may be inaccessible to a host system.

Some examples of the method 800 and the apparatus described herein may further include operations, features, means, or instructions for receiving, at the memory device, a third command for determining whether second data associated with the second software image may have been modified, where the third command includes the first indication of the relationship of the second software image with the first software image.

Some examples of the method 800 and the apparatus described herein may further include operations, features, means, or instructions for generating a third hash of the third data based on receiving the third command, and storing the third hash of the third data to a volatile memory component of the memory device based on generating the third hash.

Some examples of the method 800 and the apparatus described herein may further include operations, features, means, or instructions for comparing the third hash of the third data with the second hash associated with the second software image based on storing the third hash of the third data to the volatile memory component, and where authenticating the second software image includes determining whether the third hash of the third data may be the same as the second hash associated with the second software image based on comparing the third hash of the third data with the second hash associated with the second software image.

Some examples of the method 800 and the apparatus described herein may further include operations, features, means, or instructions for refraining from authenticating the second software image by generating a notification based on determining the third hash of the third data may be different than the second hash, where the notification includes an indication that the third data may be different than the second hash, and transmitting the notification to a host system.

In some examples of the method 800 and the apparatus described herein, authenticating the second software image may include operations, features, means, or instructions for issuing a fourth command based on determining the third hash of the third data matches the second hash associated with the second software image, where the fourth command includes an instruction to initiate a boot sequence.

Some examples of the method 800 and the apparatus described herein may further include operations, features, means, or instructions for refraining from authenticating the second software image by issuing a fourth command based on determining the third hash of the third data may be different than the second hash associated with the second software image, where the fourth command includes an instruction to refrain from initiating a boot sequence.

In some examples of the method 800 and the apparatus described herein, the second software image includes data indicating a difference between the first software image and the second software image.

In some examples of the method 800 and the apparatus described herein, the calculated hash of the first hash may be stored in a volatile memory component of the memory device.

In some examples of the method 800 and the apparatus described herein, the first hash and a location of the first data may be stored in the non-volatile memory component.

It should be noted that the methods described above describe possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an application-specific integrated-circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
generating a first hash of a first software image based at least in part on first data associated with the first software image and receiving a first command;
generating a second hash associated with a second software image based at least in part on the first hash of the first software image and receiving the second software image;
generating an indication of a relationship between the second software image and the first software image based at least in part on receiving the second software image;
storing, in a non-volatile memory component of a memory device based at least in part on generating the indication, the second hash and the indication, wherein the non-volatile memory component is inaccessible to a host device; and
erasing, after storing the second hash and based at least in part on receiving a second command to erase the second hash, the second hash and one or more additional hashes from the non-volatile memory component.

2. The method of claim 1, further comprising:
storing the first hash in the non-volatile memory component of the memory device based at least in part on generating the first hash.

3. The method of claim 2, wherein the first command comprises a save command that indicates a second range of addresses, and wherein storing the first hash is based at least in part on receiving the first command.

4. The method of claim 1, further comprising:
identifying second data associated with the second software image based at least in part on receiving the second software image; and
identifying, based at least in part on identifying the second data, an address of the second data that is associated with a first range of addresses, wherein generating the indication is based at least in part on identifying the address of the second data.

5. The method of claim 1, further comprising:
generating a second indication of the relationship between the first software image and the first hash based at least in part on generating the first hash, wherein generating the second hash is based at least in part on generating the second indication.

6. The method of claim 1, wherein the indication comprises a pointer associated with a location of the second software image, wherein storing the second hash and the indication is based at least in part on the pointer.

7. The method of claim 1, wherein the second software image comprises second data indicating a difference between the first software image and the second software image.

8. A method, comprising:
generating a first hash of a first software image and a second hash of a second software image based at least in part on receiving the first software image and the second software image;
authenticating the second software image by comparing the first hash with the second hash;
identifying one or more additional hashes of one or more respective software images depending from the second software image;
erasing the one or more additional hashes based at least in part on receiving a command to erase the second hash and identifying the one or more additional hashes; and
erasing the second hash based at least in part on erasing the one or more additional hashes.

9. The method of claim 8, further comprising:
determining that the second software image depends from the first software image, wherein the second software image comprises a modified copy of the first software image.

10. The method of claim 8, further comprising:
generating the one or more additional hashes of the one or more respective software images based at least in part on the second hash.

11. The method of claim 10, further comprising:
determining that the one or more respective software images associated with the second software image depend from the second software image; and
regenerating, before erasing the second hash, the one or more additional hashes.

12. The method of claim 8, further comprising:
determining that the one or more respective software images associated with the second software image depend from the second software image; and
erasing, before erasing the second hash, the one or more additional hashes.

13. The method of claim 8, wherein authenticating the second software image further comprises:
determining a mismatch between the second hash and the first hash; and
transmitting signaling to a host device indicating the mismatch between the second hash and the first hash.

14. The method of claim 8, wherein the second software image comprises data indicating a difference between the first software image and the second software image.

15. A system, comprising:
one or more memory arrays; and
a secure storage device coupled with the one or more memory arrays, the secure storage device configured to:
generate a first hash of a first software image and a second hash of a second software image based at least in part on receiving the first software image and the second software image;
authenticate the second software image by comparing the first hash with the second hash;
identify one or more additional hashes of one or more respective software images depending from the second software image; and
erase the one or more additional hashes prior to erasing the second hash based at least in part on receiving a command to erase the second hash and identifying the one or more additional hashes.

16. The system of claim 15, wherein the secure storage device is configured to:
determine that the second software image depends from the first software image, wherein the second software image comprises a modified copy of the first software image.

17. The system of claim 15, wherein the secure storage device is configured to:
generate the one or more additional hashes of the one or more respective software images based at least in part on the second hash.

18. The system of claim 17, wherein the secure storage device is configured to:
determine that the one or more respective software images associated with the second software image depend from the second software image; and
regenerate, before erasing the second hash, the one or more additional hashes.

19. The system of claim 15, wherein the secure storage device is configured to:
determine that the one or more respective software images associated with the second software image depend from the second software image; and
erase, before erasing the second hash, the one or more additional hashes.

20. The system of claim 15, wherein to authenticate the second software image, the secure storage device is configured to:
determine a mismatch between the second hash and the first hash; and
transmit signaling to a host device indicating the mismatch between the second hash and the first hash.

* * * * *